United States Patent [19]
Wirobski et al.

[11] Patent Number: 5,830,922
[45] Date of Patent: Nov. 3, 1998

[54] PROCESS FOR POST-EXPANSION OF PRE-EXPANDED POLYOLEFINS BEADS

[75] Inventors: Reinhard Wirobski, Marl; Bernd Guenzel, Haltern, both of Germany

[73] Assignee: Huels Aktiengesellschaft, Marl, Germany

[21] Appl. No.: 26,535

[22] Filed: Feb. 20, 1998

[30] Foreign Application Priority Data

Feb. 21, 1997 [DE] Germany ............... 197 06 884.7

[51] Int. Cl.⁶ ................. C08J 9/22; C08J 9/228
[52] U.S. Cl. ............ 521/58; 264/55; 264/DIG. 9; 521/56; 521/60
[58] Field of Search ............... 521/58, 56, 60; 264/55, DIG. 9

[56] References Cited

U.S. PATENT DOCUMENTS

| | | |
|---|---|---|
| 5,380,766 | 1/1995 | Träger et al. . |
| 5,480,599 | 1/1996 | Leven et al. . |
| 5,550,170 | 8/1996 | Träger et al. . |
| 5,618,478 | 4/1997 | Wirobski et al. . |

FOREIGN PATENT DOCUMENTS

| | | |
|---|---|---|
| 0 053 333 | 6/1982 | European Pat. Off. . |
| 0 123 144 | 10/1984 | European Pat. Off. . |
| 0 164 855 | 12/1985 | European Pat. Off. . |
| 0 168 954 | 1/1986 | European Pat. Off. . |
| 0 453 836 | 10/1991 | European Pat. Off. . |
| 0 630 935 | 12/1994 | European Pat. Off. . |
| 0 646 619 | 4/1995 | European Pat. Off. . |
| 0 734 829 | 10/1996 | European Pat. Off. . |
| 39 22 207 | 1/1991 | Germany . |

*Primary Examiner*—Morton Foelak
*Attorney, Agent, or Firm*—Oblon, Spivak, McClelland, Maier & Neustadt, P.C.

[57] ABSTRACT

Partially expanded polyolefin granules are post-expanded by a process comprising charging a vessel containing foamed polyolefin beads having a bulk density of from 20–450 g/l with an inert gas under a pressure of from 2–25 bar and at a temperature of from $T_m-150°$ C. to $T_m-40°$ C. over a period of from 1–48 h, and then continuously or discontinuously transferring the pressurized foam beads into an apparatus in which a fluidized bed is created, where the beads expand further at a temperature of from $T_m-75°$ C. to $T_m+20°$ C.

The resultant foamed beads are suitable for producing foamed moldings.

14 Claims, No Drawings

PROCESS FOR POST-EXPANSION OF PRE-EXPANDED POLYOLEFINS BEADS

BACKGROUND OF THE INVENTION

1. Field of the Invention

The present invention relates to a process for converting polyolefinic foam beads of high bulk density into foam beads of low bulk density.

2. Description of the Background

Moldable polyolefinic foams are known. They can be prepared by a wide variety of processes, a common feature of which is that an aqueous dispersion of granules is heated under superatmospheric pressure in the presence of a blowing agent, after which the hot dispersion is released through a nozzle into a low-pressure space. Here, the granules expand. The rate of expansion is dependent mainly on the type of granules, the expansion temperature and the type and amount of blowing agent.

When compared with the preparation of moldable polystyrene foam, the preparation of moldable polyolefin foam suffers from a serious disadvantage in that it is virtually impossible to store blowing agent in the granules. Therefore, while polystyrene beads, which have been charged with a volatile blowing agent, can be transported and converted into foam without difficulty, this cannot be done with polyolefins. It is necessary to expand the latter to their final bulk density at the outset, creating high storage and transport costs. There are ways of firstly preparing a foam of relatively high bulk density by controlled preparation of size-reduced foam beads, the size reduction then firstly being reversed by the converter by pressurization and release of pressure before conversion (DE 39 22 207, EP 0 453 836) or, in an improved process, the beads are directly converted into low-density moldings immediately after pressurization, with the internal pressure retained to a large extent (EP 0 734 829). The reduction in volume thus achievable is, however, only a first step toward reduction of the storage and transport costs. A need continues to exist for an improved method of post-expanding partially expanded polyolefin beads.

SUMMARY OF THE INVENTION

Accordingly, one object of the present invention is to provide foamed polyolefin beads with the highest possible density which can be post-expanded to give lower-density foam beads by suitable aftertreatment measures.

Briefly, this object and other objects of the present invention as hereinafter will become more readily apparent can be attained by a process for post-expanding partially expanded polyolefin granules by charging a vessel containing foamed polyolefin beads having a bulk density of from 20–450 g/l with an inert gas under a pressure of from 2–25 bar and at a temperature of from $T_m \times 150°$ C. to $T_m \times 40°$ C. over a period of from 1–48 h, and then continuously or discontinuously transferring the pressurized foamed beads into an apparatus in which a fluidized bed is created, where the beads expand further at a temperature of from $T_m - 75°$ C. to $T_m + 20°$ C.

DETAILED DESCRIPTION OF THE PREFERRED EMBODIMENTS

In an embodiment of the invention, the pressurized foamed polyolefin beads are transferred through a valve into an unpressurized apparatus maintained at a temperature of from $T_m - 75°$ C. to $T_m + 20°$ C., after which the expanded beads are removed. "Unpressurized" here is taken to mean that the pressure within the apparatus is approximately atmospheric pressure.

In a further embodiment of the invention, the pressurized foam beads are heated in a pressure-tight apparatus-to a temperature of from $T_m - 75°$ C. to $T_m + 20°$ C., and then the beads are discharged into an environment at atmospheric pressure.

Suitable polyolefins include, for example, propylene polymers such as propylene-ethylene or propylene-butylene random copolymers, random terpolymers of ethylene, propylene and 1-butene, ethylene-propylene block copolymers and homopolypropylene, ethylene polymers, such as low-, medium- or high-density polyethylene, low-density linear polyethylene, ethylene-vinyl acetate copolymers, ethylene-methyl methacrylate copolymers, ionomers and other polyolefins such as poly-1-butene. An ethylene-propylene random copolymer having from 1–15% by weight of ethylene is preferably employed.

During the pre-expansion, these polymers are in the form of discrete beads. They preferably have a mean particle diameter of from 0.5–5 mm. In order to achieve uniform expansion, they may, if desired, contain a filler which functions as nucleating agent, as in the prior art.

The dispersion medium is preferably water, but alcohols such as methanol and ethanol are also suitable.

In order to prevent agglomeration, a finely divided dispersing agent and/or a surfactant may be added to the mixture of polymer beads and dispersion medium. Examples of these materials include calcium phosphate, basic magnesium carbonate, basic zinc carbonate, calcium carbonate, alumina, barium sulfate talc, alkylbenzenesulfonates, paraffinsulfonates and ethoxylates.

To regulate the density of the foam beads, it is expedient also to add a volatile blowing agent. Suitable blowing agents are known in the prior art and include saturated aliphatic hydrocarbons such as ethane, propane, n-butane, isobutane, pentane and hexane, alicyclic hydrocarbons such as cyclopentane and cyclohexane; halogenated hydrocarbons such as trichloromonofluoromethane, dichlorodifluoromethane, dichlorotetrafluoroethane, trichlorotrifluoroethane, dichloromonofluoromethane, methyl chloride, methylene chloride and ethyl chloride; and inorganic gases such as carbon dioxide and nitrogen, in each case individually or as a mixture.

If no volatile blowing agent is added, the dispersion medium itself acts as blowing agent. Although only modest to moderate rates of expansion are achieved by this means, this is exactly the intention in the case of the present invention.

The dispersion is heated as in the prior art and then released through an expansion nozzle into a low-pressure space, whereupon the beads expand and/or have a cell structure impressed upon them.

Suitable processes for preparing moldable polyolefinic foams are described, for example, in EP 0 053 333, EP 0 630 935 and EP 0 646 619.

For the purposes of this invention, the crystalline melting point $T_m$ of the polyolefin is determined using a DSC measurement in which a sample of the polyolefin is heated to 210° C. at a rate of 20° C./min and then cooled to −30° C. at a rate of 20° C./min, and then heated again at a rate of 20° C./min. The maximum of the peak which appears during this regime gives $T_m$.

It is known, furthermore, that foamed polyolefin beads may also possess a high-temperature melting peak attributable to secondary crystals (EP 0 123 144; EP 0 164 855; EP 0 168 954). For the purposes of the present invention, preference is given to the use of partially expanded granules of this type, particular preference being given to pressurization with an inert gas at from $T_{min}-125°$ C. to $T_{min}-60°$ C. and post-expansion in the range from $T_{min}-35°$ C. to $T_{min}+10°$ C. $T_{min}$ here is the minimum between the first and second peaks of the first heating curve in the DSC measurement. For an ethylene-propylene random copolymer having an ethylene content of about 3.5% by weight, $T_{min}$ is in the range from about 150° C. to about 156° C.

A suitable inert gas used for the pressurization is, for example, nitrogen, air or $CO_2$.

Apparatuses suitable for the post-expansion are those in which a fluidized bed can be created either mechanically or pneumatically. For a mechanically created fluidized bed, a stirred vessel, a paddle drier or a tumble drier may, for example, be used, while for a pneumatically created fluidized bed, a fluidized-bed apparatus, a tubular flow drier or a similar apparatus can be employed.

In one embodiment, the apparatus used for the post-expansion is of pressure-tight design, enabling heating of the pressurized, partially expanded granules, e.g. with saturated steam. Depending on the temperature, the residence time of the partially expanded granules in this process is from 30–300 seconds and the steam pressure is from 1.7–5.5 bar. After this time, the partially expanded, heated granules are discharged into an environment which is under atmospheric pressure.

Surprisingly, partially expanded granules can be further expanded by the present process to give foamed beads of low bulk density, making it possible to cover a very large range of bulk densities using a single grade of heavy granules. Furthermore, the step of post-expansion may be repeated if necessary in order to achieve a further reduction in bulk density. This can be especially useful when partially expanded granules having a bulk density above 350 g/l are used.

The foamed beads prepared according to the invention are distinguished by a flat, glossy surface. Furthermore, use of cylindrical granules gives substantially spherical foamed beads. The foamed beads can be converted into moldings by any of the methods of the prior art.

Having generally described this invention, a further understanding can be obtained by reference to certain specific examples which are provided herein for purposes of illustration only and are not intended to be limiting unless otherwise specified.

In all of the examples, use is made of partially expanded granules prepared in each case from the same raw granules according to the prior art.

EXAMPLES

Example 1

Partially expanded granules of an ethylene-propylene random copolymer with $T_m \times 147°$ C. and $T_m=153°$ C. and a bulk density of 21 g/l are treated for 20 h at 30° C. under a pressure of 4.6 bar. The pressure in the pressure vessel is then released, and the pressurized, partially expanded granules are transferred in portions onto a fluidized bed having an air temperature of 140° C. The volume flow of air is adjusted so that intensive mixing is ensured. The post-expanded, lighter foamed beads accumulate at the top of the apparatus, since their larger volume gives them greater buoyancy, and they then flow out of the fluidized-bed apparatus over a weir, are discharged and cooled The final bulk density is 14 g/l, see Table 1.

Example 2

The procedure of Example 1 is repeated, except that partially expanded granules having a bulk density of 53 g/l are used as the starting material. The process parameters and the results are given in Table 1.

Example 3

The procedure of Example 1 is repeated, except that partially expanded granules having a bulk density of 83 g/l are used as the starting material. The process parameters and results are given in Table 1.

Example 4

Partially expanded granules having a bulk density of 210 g/l are held in a pressure-tight reactor for 10 h at 80° C. under a pressure of 6 bar, during which the contents are thoroughly mixed. After this, the pressure in the reactor is released and saturated steam is introduced. The steam pressure of 5.1 bar, corresponding to a temperature of 153° C., is held for 4 minutes, after which the pressure in the reactor is released and the post-expanded moldable foam is discharged.

TABLE 1

PROCESS PARAMETERS AND RESULTS

| Example | Bulk Density (g/l) | After-treatment | | | Post-expansion | | Bulk Density (g/l) |
|---|---|---|---|---|---|---|---|
| | | T(°C.) | P(bar) | t(h) | T(°C.) | t(min) | |
| 1 | 21 | 30 | 4.6 | 20 | 140 | 1 | 14 |
| 2 | 53 | 30 | 4.6 | 20 | 145 | 1 | 25 |
| 3 | 83 | 50 | 5.8 | 12 | 160 | 3 | 24 |
| 4 | 210 | 80 | 6 | 10 | 153 | 4 | 63 |

The disclosure of priority German Patent Application No. 197 06 884.7 filed Feb. 21, 1997 is hereby incorporated by reference.

Obviously, numerous modifications and variations of the present invention are possible in light of the above teachings. It is, therefore, to be understood that within the scope of the appended claims, the invention may be practiced otherwise than as specifically described herein.

What is claimed and is desired to be secured by Letters Patent is:

1. A process for post-expanding partially expanded polyolefin granules, comprising:

charging a vessel containing foamed polyolefin beads having a bulk density of from 20–450 g/l with an inert gas under a pressure of from 2–25 bar and at a temperature of from $T_m-150°$ C. to $T_m-40°$ C. over a period of from 1–48 h; and then continuously or discontinuously transferring the pressurized foam beads into an apparatus in which a fluidized bed is created, where the beads expand further at a temperature of from $T_m-75°$ C. to $T_m+20°$ C.

2. The process as claimed in claim 1, wherein the pressurized foam beads are transferred through a valve into an unpressurized apparatus maintained at a temperature of from $T_m-75°$ C. to $T_m+20°$ C., after which the expanded beads are removed.

3. The process as claimed in claim 1, wherein the pressurized foam beads are heated in a pressure-tight apparatus to a temperature of from $T_m-75°$ C. to $T_m+20°$ C., and then the beads are discharged into an environment at atmospheric pressure.

4. The process as claimed in claim 1, wherein the charging of the inert gas into the vessel takes place at from 3–10 bar over a time of from 5–20 h.

5. The process as claimed in claim 2, wherein the charging of the inert gas into the vessel takes place at from 3–10 bar over a time of from 5–20 h.

6. The process as claimed in claim 3, wherein the charging of the inert gas into the vessel takes place at from 3–10 bar over a time of from 5–20 h.

7. The process as claimed in claim 1, wherein the polyolefin is an ethylene-propylene random copolymer having from 1–15% by weight of ethylene.

8. The process as claimed in claim 2, wherein the polyolefin is an ethylene-propylene random copolymer having from 1–15% by weight of ethylene.

9. The process as claimed in claim 3, wherein the polyolefin is an ethylene-propylene random copolymer having from 1–15% by weight of ethylene.

10. The process as claimed in claim 1, wherein said polyolefin is a member selected from the group consisting of propylene-ethylene copolymer, propylene-butylene random copolymer, random terpolymers of ethylene, propylene and 1-butene, ethylene-propylene block copolymers, homopolypropylene, low-, medium- or high-density polyethylene, low-density linear polyethylene, ethylene-vinyl acetate copolymer, ethylene-methyl methacrylate copolymer, ionomers and poly-1-butene.

11. The process as claimed in claim 1, wherein the partially expanded polyolefin beads have a mean particle diameter of from 0.5–5 mm.

12. The process as claimed in claim 1, wherein, in said expansion step, a blowing agent selected from the group consisting of ethane, propane, n-butane, isobutane, pentane and hexane, cyclopentane, cyclohexane, trichloromonofluoromethane, dichlorodifluoromethane, dichlorotetrafluoroethane, trichlorotrifluoroethane, dichloromonofluoromethane, methyl chloride, methylene chloride, ethyl chloride, carbon dioxide and nitrogen, in each case individually or as a mixture, is injected into said vessel.

13. The process as claimed in claim 1, wherein the polyolefin foam beads have a high-temperature melting peak.

14. The process as claimed in claim 13, wherein the charging with inert gas is conducted at a temperature of from $T_{min}-125°$ C. to $T_{min}-60°$ C. and the further expansion is conducted in the range of from $T_{min}-35°$ C. to $T_{min}+10°$ C., wherein $T_{min}$ is the minimum between the first and second peaks of the first heating curve in the DSC measurement.

* * * * *